United States Patent
Deshpande

(10) Patent No.: US 7,870,541 B1
(45) Date of Patent: Jan. 11, 2011

(54) CONTEXT TRACING FOR SOFTWARE WITH A FRAME POINTER AND A STACK POINTER AND WITH A STACK POINTER BUT WITHOUT A FRAME POINTER

(75) Inventor: Anand V. Deshpande, Sunnyvale, CA (US)

(73) Assignee: Wind River Systems, Inc., Alameda, CA (US)

( * ) Notice: Subject to any disclaimer, the term of this patent is extended or adjusted under 35 U.S.C. 154(b) by 1679 days.

(21) Appl. No.: 10/979,877

(22) Filed: Nov. 1, 2004

(51) Int. Cl.
*G06F 9/44* (2006.01)
(52) U.S. Cl. ...................... 717/131; 717/124
(58) Field of Classification Search ............ None
See application file for complete search history.

(56) References Cited

U.S. PATENT DOCUMENTS

| | | | | |
|---|---|---|---|---|
| 5,388,263 A | * | 2/1995 | Ellis et al. | 717/124 |
| 6,009,517 A | * | 12/1999 | Bak et al. | 712/245 |
| 6,732,355 B1 | * | 5/2004 | Ogasawara | 717/128 |
| 6,948,034 B2 | * | 9/2005 | Aoki | 711/132 |
| 2004/0083460 A1 | * | 4/2004 | Pierce | 717/131 |
| 2004/0143721 A1 | * | 7/2004 | Pickett et al. | 711/217 |

FOREIGN PATENT DOCUMENTS

JP 2007052676 A * 3/2007

OTHER PUBLICATIONS

"Halting problem" as downloaded from <http://en.wikipedia.org/wiki/Halting_problem> on Oct. 1, 2009.*

* cited by examiner

*Primary Examiner*—Jason Mitchell
(74) *Attorney, Agent, or Firm*—Fay Kaplun & Marcin, LLP

(57) ABSTRACT

A computer implemented method or computer readable code for determining function call history for a system, which runs both code with a frame pointer and a stack pointer and code with a stack pointer and without a frame pointer. Execution is frozen on at least one CPU. A function of plurality of functions that were executing on the at least one CPU is stepped through, where some of the plurality of functions have a frame pointer and a stack pointer and some of the plurality of functions have a stack pointer but do not have a frame pointer. The stack offset to the stack memory location, where the return address in parent function is stored, is calculated to find the return address in parent function, which called the function being stepped through.

22 Claims, 10 Drawing Sheets

```
void funcA() {
    .
    .
    funcB();      ← RETURN
    .               ADDRESS
    .               (RA) 403
} void funcB() {
    .
    .
    funcC();      ← RETURN
    .               ADDRESS
    .               (RA) 402
} void funcC() {
    .
    .
    I = 0;        ← PROGRAM
    .               COUNTER
                    (PC) 401
}
```

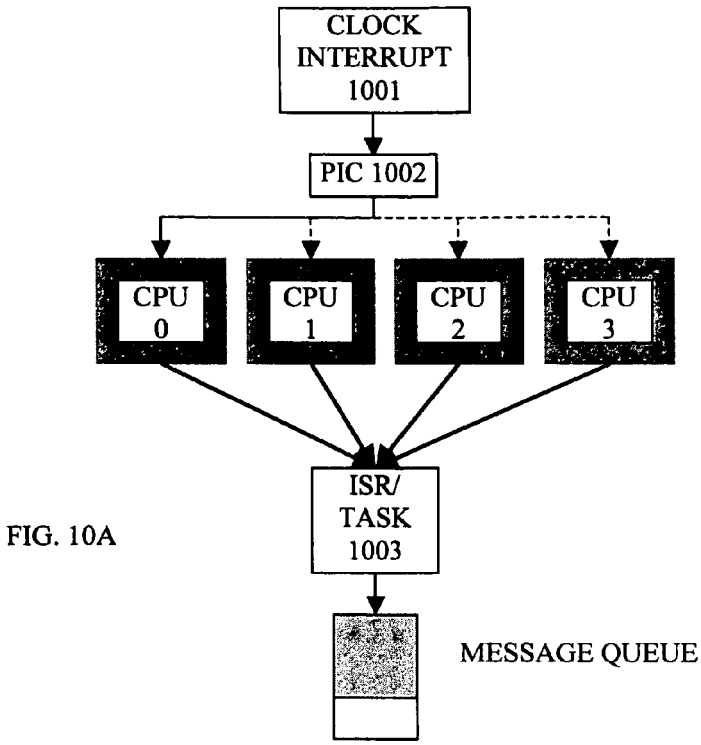
FIG. 10A
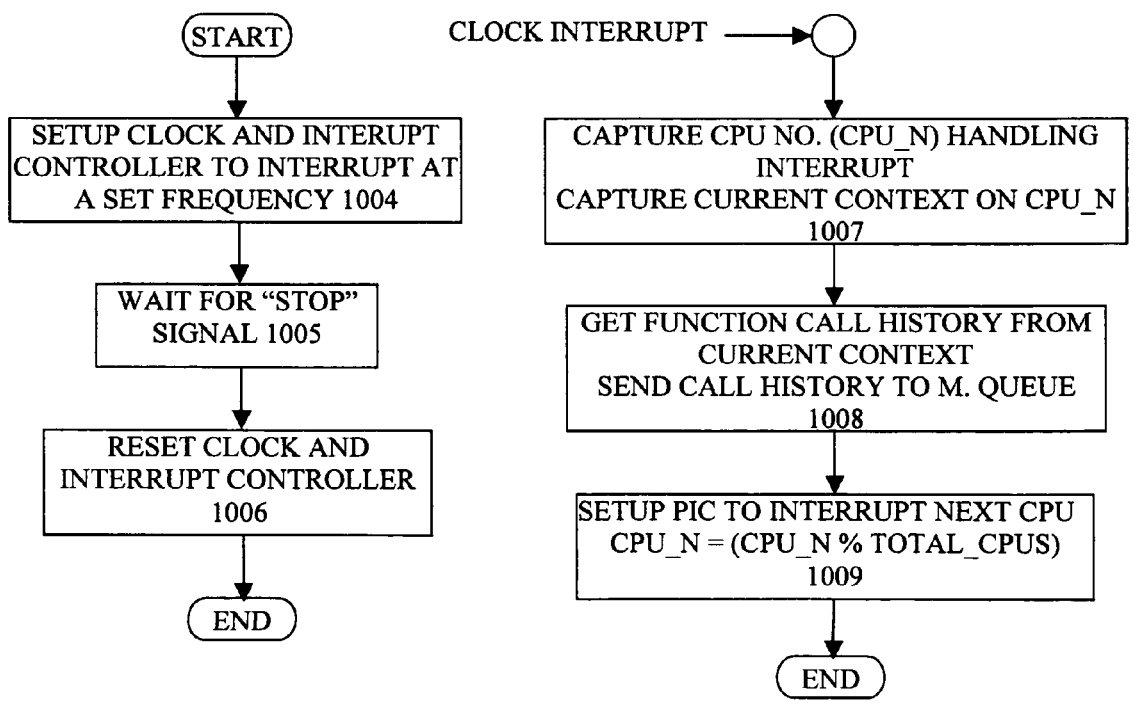
FIG. 10B
FIG. 10C

CONTEXT TRACING FOR SOFTWARE WITH A FRAME POINTER AND A STACK POINTER AND WITH A STACK POINTER BUT WITHOUT A FRAME POINTER

BACKGROUND OF THE INVENTION

The present invention relates to software analysis and, more particularly, to a method of determining execution state of a single or multiple processors at any given time.

When designing a computer-based system, a determination is made about whether the system has enough computational resources such as processor speed, static or volatile memory, and peripherals to run the intended application. Conversely, system designers face an uphill task to figure out whether the given application is optimally using system resources or it needs some tweaking for optimal resource utilization. The software analysis tools that help answer these questions are called profilers. A profiler reports information such as how much time the processor is spending in a function, how often each function is called, which functions the processor calls through before running a given function, how long different threads of execution run on a processor, what is the pattern of processor or memory usage over time. For a multi-processor system, a profiler reports above information potentially for each processor in the system. This information forms the basis for reporting and analyzing information about higher level application or operating system constructs such as heap memory, execution threads, semaphores, queues, events etc.

A profiler gathers information about a given system by various methods such as source or object code instrumentation, runtime system patching and runtime invasive system analysis. Source code instrumentation method modifies the application source code with certain "hooks" to facilitate information collection when application runs. Source code instrumentation method therefore needs application source code and recompilation of source to be effective. On the other hand, object code instrumentation method works by "patching" the application object code with the "information collection hooks" and therefore needs re-linking of object code. Advantages of object code instrumentation are that it doesn't need application source and therefore allows analysis of third party object code also.

A runtime system patching method works by modifying the running system object code in memory with "information collection hooks". A big advantage of this method is that user doesn't need to re-compile or re-link application code to perform analysis and user can monitor a live system possibly deployed in the field.

Another method of analyzing a system involves periodically "snooping" into the system to figure out what the system was doing when the system snooped into. This periodic snooping gives statistical information about the system such as performance bottlenecks in the system, major thread behavior on all processors in the system, where each processor is "most often" spending time etc.

SUMMARY OF THE INVENTION

To achieve the foregoing and other objects and in accordance with the purpose of the present invention, a computer implemented method or computer readable code for determining function call history for a system, which runs both code with a frame pointer and a stack pointer and code with a stack pointer and without a frame pointer is provided. Execution is frozen on at least one CPU. A function of plurality of functions that were executing on the at least one CPU is stepped through, where some of the plurality of functions have a frame pointer and a stack pointer and some of the plurality of functions have a stack pointer but do not have a frame pointer, comprising keeping track of instructions that change a stack pointer, keeping track of instructions that change a frame pointer, determining what instructions change at least one of the stack pointer and the frame pointer to determine an offset to a return address when the function of the plurality of functions being stepped through has a frame pointer and stack pointer, and determining what instructions change the stack pointer and offset to the return address, while saving a current frame pointer when the function of the plurality of functions being stepped through has a stack pointer but not a frame pointer. The offset is used to find a parent function that called the function being stepped through.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 10A, 10B, and 10C depict a statistical approach of profiling a generic multi-processor system.

DETAILED DESCRIPTION OF THE PREFERRED EMBODIMENTS

Figure 1A:
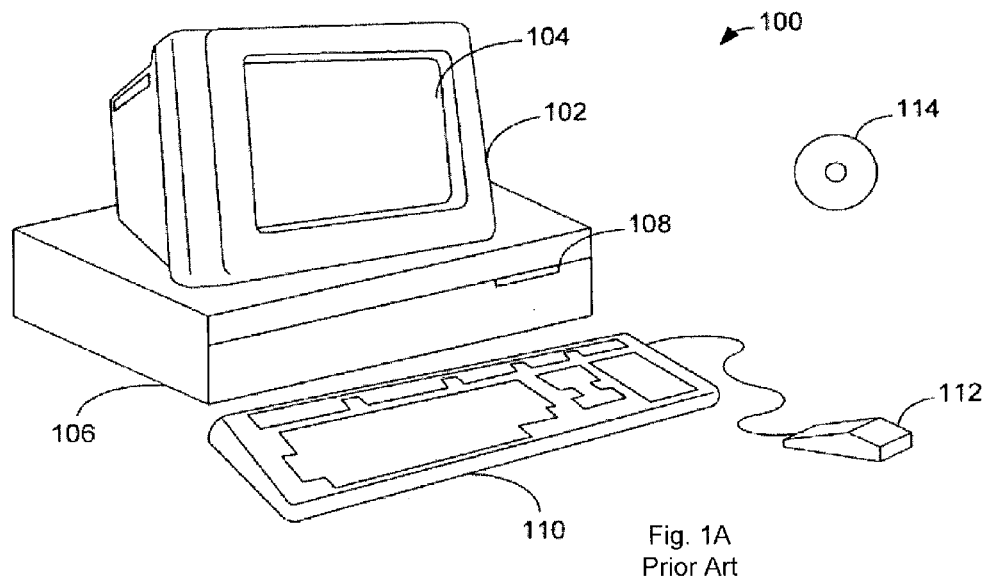
FIGS. 1A and 1B illustrate a computer system, which may be programmed to provide the inventive process.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

The present invention relates to determining which function the processor is currently executing, which functions the processor has come through to execute the current function, and how to gather the aforementioned information for each processor in a multi-processor system. This method hereafter is referred to as "context tracing" whenever appropriate. In accordance with the present invention, a method to perform context tracing of a running system is provided. Context tracing involves figuring out which function a processor is currently executing, and which parent functions the processor has already called before reaching the current function. The present invention also details a method of context tracing for each processor in a multi-processor system. The present invention does not require that system code be re-compiled with special compiler flags or re-linked to perform the analysis. Therefore, the present invention facilitates analysis of user code as well as the third party code. An important advantage of a current manifestation of the present invention is that a user is not required to re-compile or re-link application code to analyze the application. Therefore, the current manifestation of the invention is useful for, but not limited to, different runtime analysis methods such as system patching or invasive system analysis discussed above. Another important advantage of the current manifestation of the present invention is that it does not require that an application be pre-compiled with special compiler flags such as frame pointers to perforin an analysis.

A frame pointer of a function is a memory address value, which marks the beginning of a function's stack frame. It may be used as a book mark for a function's stack frame. Before executing the first instruction of a function, the processor usually puts the address of the instruction, the processor should execute after executing the corresponding function, on the stack. Therefore, if an application is compiled with the frame pointer, reading the frame pointer value of a function takes the application to the beginning of the corresponding function's stack frame and subsequently to the address (called return address of a function hereafter) in the parent function, which called the corresponding function. Therefore, getting the frame pointer value of each function in a function call history is usually sufficient to get to the "topmost" function, which ultimately has started a thread of execution. Existing remote or local debuggers require that all the functions, an application executes, be compiled with the frame pointer so that the debugger can determine the function call history of a thread of execution. Since, the present invention doesn't always need frame pointers, the present invention is useful for systems running both code with frame pointers and code without frame pointers.

The invention is able to perform the context tracing of a live system. The invention is able to perform the context tracing without any requirement for the system code be compiled with special compiler flags such as frame pointers. The invention is able to provide context tracing in a uni-processor and multi-processor system.

To facilitate understanding of the invention, FIGS. 1A and B illustrate a computer system 100, which may be programmed to provide the inventive process. FIG. 1A shows one possible physical form of a computer system that may be used to practice the invention. Of course, the computer system may have many physical forms ranging from an integrated circuit, a printed circuit board, and a small handheld device up to a huge super computer. Computer system 100 includes a monitor 102, a display 104, a housing 106, a disk drive 108, a keyboard 110, and a mouse 112. Disk 114 is a computer-readable medium used to transfer data to and from computer system 100.

Figure 1B:
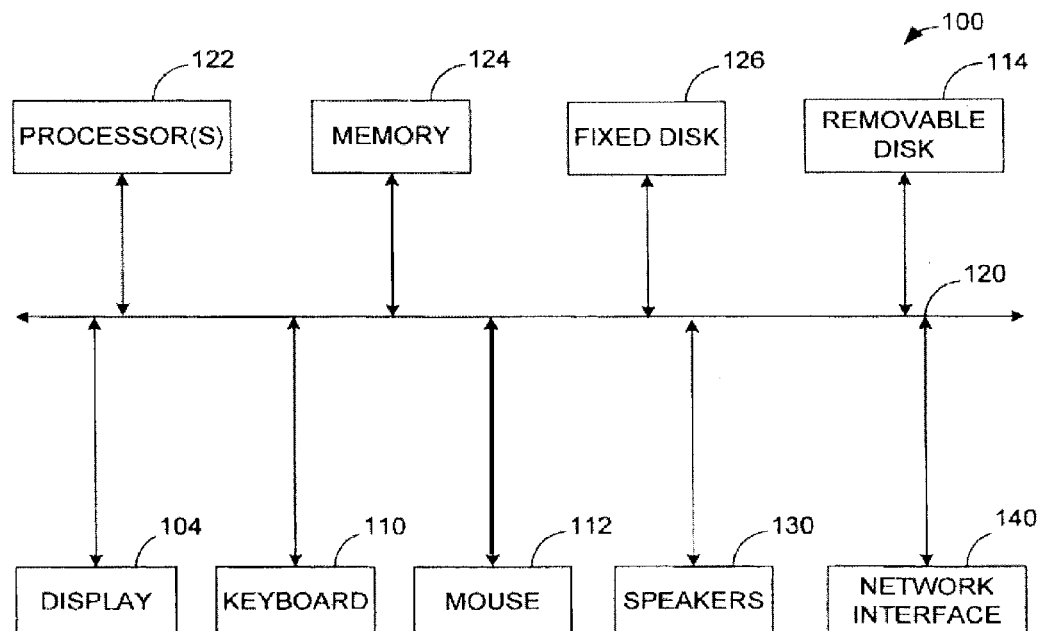

FIG. 1B is an example of a block diagram for computer system 100. Attached to system bus 120 is a wide variety of subsystems. Processor(s) 122 (also referred to as central processing units, or CPUs) are coupled to storage devices, including memory 124. Memory 124 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable type of the computer-readable media described below. A fixed disk 126 is also coupled bi-directionally to CPU 122; it provides additional data storage capacity and may also include any of the computer-readable media described below. Fixed disk 126 may be used to store programs, data, and the like and is typically a secondary storage medium (such as a hard disk) that is slower than primary storage. It will be appreciated that the information retained within fixed disk 126 may, in appropriate cases, be incorporated in standard fashion as virtual memory in memory 124. Removable disk 114 may take the form of any of the computer-readable media described below.

CPU 122 is also coupled to a variety of input/output devices, such as display 104, keyboard 110, mouse 112, and speakers 130. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 122 optionally may be coupled to another computer or telecommunications network using network interface 140. With such a network interface, it is contemplated that the CPU might receive information from the network, or might output information to the network in the course of performing the above-described method steps. Furthermore, method embodiments of the present invention may execute solely upon CPU 122 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter. Computer readable media may also be computer code transmitted by a computer data signal embodied in a carrier wave and representing a sequence of instructions that are executable by a processor.

The present invention is not restricted to be used on a physical computer as such. It is quite common that a physical computer may execute one or more virtual machines. The present invention can also be implemented on a virtual machine.

Figure 2:
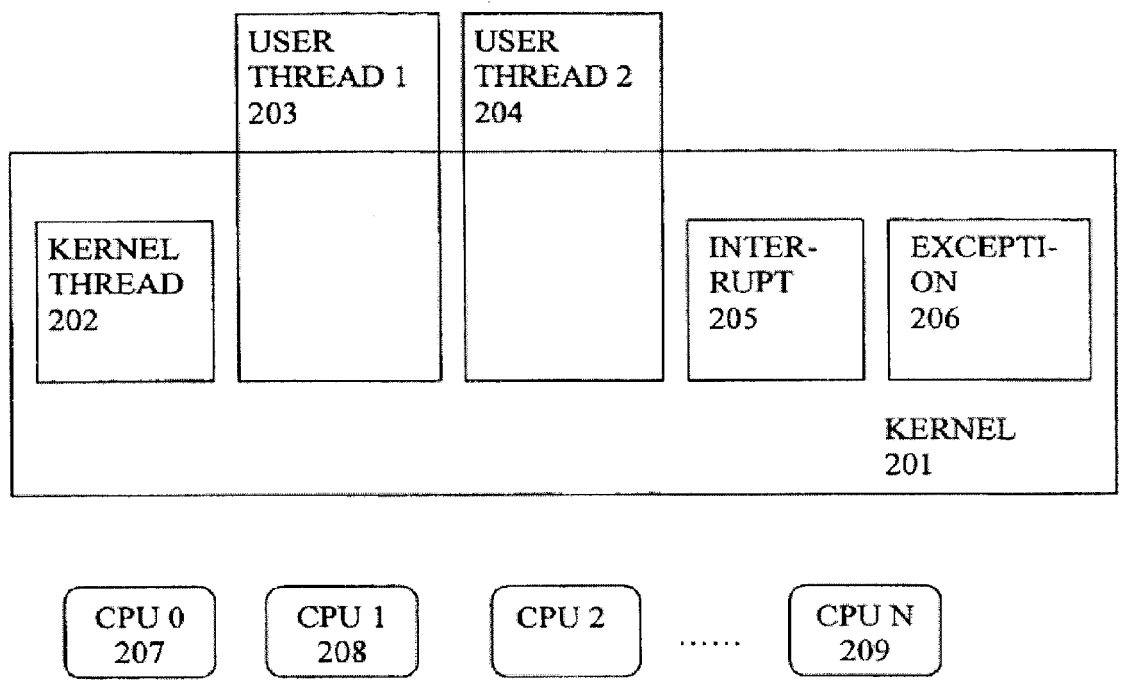
FIG. 2 is a schematic view of an Operating System (OS) and various entities the OS runs.

FIG. 2 shows a schematic view of and Operating System (OS) and various entities the OS runs. The operating system 201 is a multi-tasking system, which runs multiple entities such as user domain threads (203 and 204) or kernel domain threads (202), interrupts 205, and exceptions 206 on a single or multiple CPUs at any time. In FIG. 2, OS 201 is running on N+1 CPUs from CPU 0 (207) to CPU N (209), where N could be any number from one to any finite number. These multiple entities may or may not share the same memory space depending on the OS. Typically in a virtual memory enabled OS such as Linux, user domain threads run in a different memory space from the kernel threads, interrupts, and exceptions. Also, each user domain thread is allocated a separate virtual memory to protect it from the un-desirable effects such as crashes, software or hardware exceptional conditions of the other threads. A group of threads, collectively known as a process, may share a memory space. In a flat-memory space enabled OS such as VxWorks, all above-mentioned entities may share the same memory space.

Figure 3:
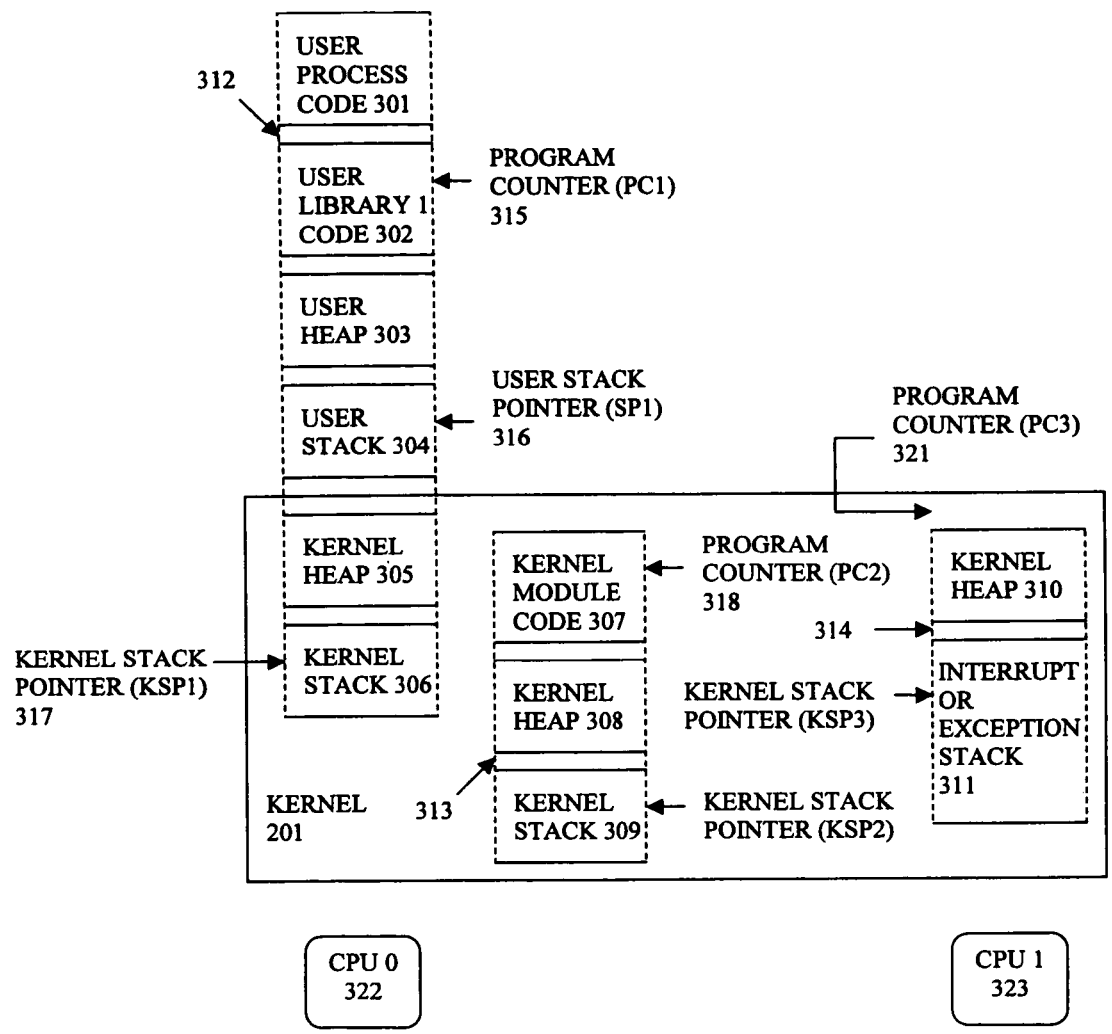
FIG. 3 is a schematic illustration of 32-bit memory space of a user process, a kernel thread, and an interrupt.

FIG. 3 is a schematic illustration of 32 bit memory space of a user process 312, a kernel thread 313, and an interrupt 314. The inventive process is equally applicable to memory space of any bit-size or any instruction width (16 bit, 32 bit, etc.) of a CPU. In FIG. 3, a user process 312 maps its own object code 301, a library object code 302 into its memory space. The process 312 also maps a user heap 303, which is used to store dynamic data at run time, and a user stack 304, which is used to store local variables of a function. Depending on the design of OS 201, the user process 312 may or may not have a kernel heap 305 and a kernel stack 306 allocated by the OS. The OS uses the kernel heap 305 to allocate temporary data, when the user process 312 executes any OS services (traditionally known as system calls). The OS may also allocate a dedicated kernel stack 306 to store local variables of functions called by various OS services. As shown in FIG. 3, a kernel thread 313 runs in the OS memory space. It maps its own object code 307 in OS memory space. Object code 307 extends OS functionality in some way. The OS uses the kernel heap 308 and the kernel stack 309 to store temporary data and local variables of OS functions respectively. Depending on the OS design, an interrupt or exception may have a dedicated kernel heap 310 and an interrupt or exception stack 311. Otherwise, the interrupt or exception may use the kernel heap (e.g. 305 or 308) or user heap (e.g. 303) (if user threads and OS share the same address space) and kernel stack (e.g. 306 or 309) or user stack (e.g. 304) (if user threads and OS share the same address space) of the thread that got interrupted due to the interrupt or exception. As mentioned previously, all afore-mentioned OS entities may be running on a single or multiple CPUs at the same time. For example with respect to FIG. 3, the user process 312 is running on the CPU 0 (322), while interrupt 0 is simultaneously running on CPU 1 (323) in a dual-CPU system. Meanwhile, kernel thread 313 is waiting to get access to any of the available CPUs.

An execution context of a thread consists of:

1. CPU—which has previously executed or is currently executing or will potentially execute the corresponding thread. In FIG. 3, user thread 312 is running on CPU 0 (322), whereas interrupt 314 is running on CPU 1 (323). Kernel thread 313 potentially has information about the CPU, which was running the thread before being swapped out to wait.

2. Program Counter—which points to the address of machine instruction that the CPU is currently executing (for running thread) or will execute (when the thread is scheduled to execute on the CPU). The program counter can point to anywhere in memory space (user or kernel), where executable machine instructions can potentially reside. In FIG. 3, CPU 0 is currently executing a machine instruction at program counter PC1 (315) in user library (302). CPU 1 is currently running an instruction at program counter PC3 (321) located in OS code. Kernel thread 313 was at program counter PC2, when the CPU swapped it out to the wait queue.

3. Stack Pointer—As described before, the stack is used to store local variables of a function and parameters passed to the function. Stack pointer points to the memory address in user or kernel stack and the machine instructions of a function fetch the local variables or the parameters of the corresponding function with respect to the stack pointer value. Therefore, stack pointer acts as an anchor to help CPU easily locate local variables of a function when the corresponding function is executing on the CPU. Stack pointer value may also change throughout a function boundary depending on the compiler. Therefore, the current stack pointer may not necessarily point to the beginning of current function's stack frame. In FIG. 3, user thread 312 is at kernel stack pointer (KSP1) 317 and at user stack pointer (SP1) 316. Kernel stack pointer KSP1 317 is used while running kernel functions, whereas user stack pointer SP1 316 is used while running user domain functions. Again, depending on the OS design, there may or may not be separate stack pointers for kernel domain and user domain functions. The inventive context tracing technique is not limited to a particular computational model. In FIG. 3, kernel thread 313 is at a kernel stack pointer KSP2 319, whereas interrupt 314 is at kernel stack pointer KSP3 320.

Given the execution context of the user thread 312 (namely CPU 0 322, program counter PC1 315, and stack pointer say SP1 316) at any given run time, the problem of context tracing involves determining the chain of functions, which CPU 0 322 went through to arrive at a given program counter PC1 315. Function call history of a particular thread helps in analyzing various types of (but is not limited to) system behavior, such as which functions different CPUs are most often executing, which functions are calling a particular function (such as malloc( ) or free( )), how often a particular function is being called, what is the pattern of processor or memory usage over time etc.

Figures 4A, 4B:
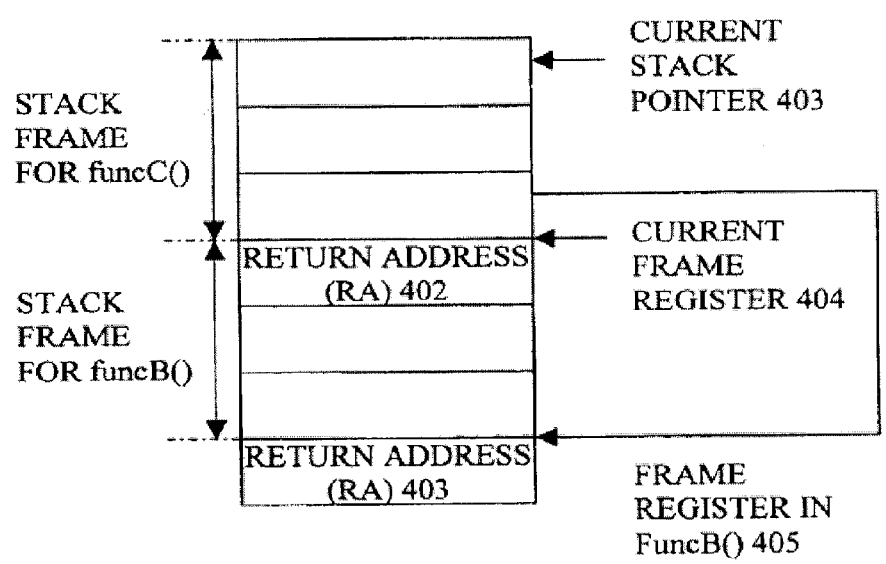
FIG. 4A shows a funcA( ) that calls funcB( ), which in turn calls funcC( ).
FIG. 4B shows a stack for the functions of FIG. 4A.

FIGS. 4A and 4B depict a way in which a function call history of a particular thread can be determined using the current execution context namely, program pointer 401 and stack pointer 403. As shown in FIG. 4A, funcA( ) calls funcB( ), which in turn calls funcC( ). The program counter PC 401 is currently at the instruction "I=0". Current stack pointer 403 points to the memory location depicted in FIG. 4B. When a function such as funcA( ) calls another function funcB( ), the return address (RA) 403 to return to, after executing funcB( ), is stored either on the stack or in the register whose value is later pushed onto stack programmatically. To easily traverse the function call chain from a given program counter, most compilers provide an option to dedicate a register (traditionally called link register or frame register), which always points to the beginning of current function's stack frame. The value, frame register holds in a given function, is called frame pointer value of that function. For example, in FIG. 4B, when funcB( ) calls funcC( ), return address (RA) 402 is saved on the stack, and frame register currently points the memory location, where return address 402 is saved. Therefore, reading current frame register 404 takes us to the parent function funcB( ) of funcC( ). As depicted in FIG. 4B, processor usually programmatically stores the frame register value of funcB( ) 405 is on the same stack above or below return address (RA) 402. Therefore, once the frame register value 404 of the current function is obtained, it is easy to get the frame register value (or frame pointer) of current function's parent function. It is to be noted that this traditional technique for determining function call history requires an application be compiled with a special compiler option, which puts frame pointers in the application code. Therefore, this technique may not work, if the application is not compiled with the special flag. Debugging tools such as gdb, kgdb, and ddd use this technique to traverse the function call history of a thread of execution.

Figure 5:
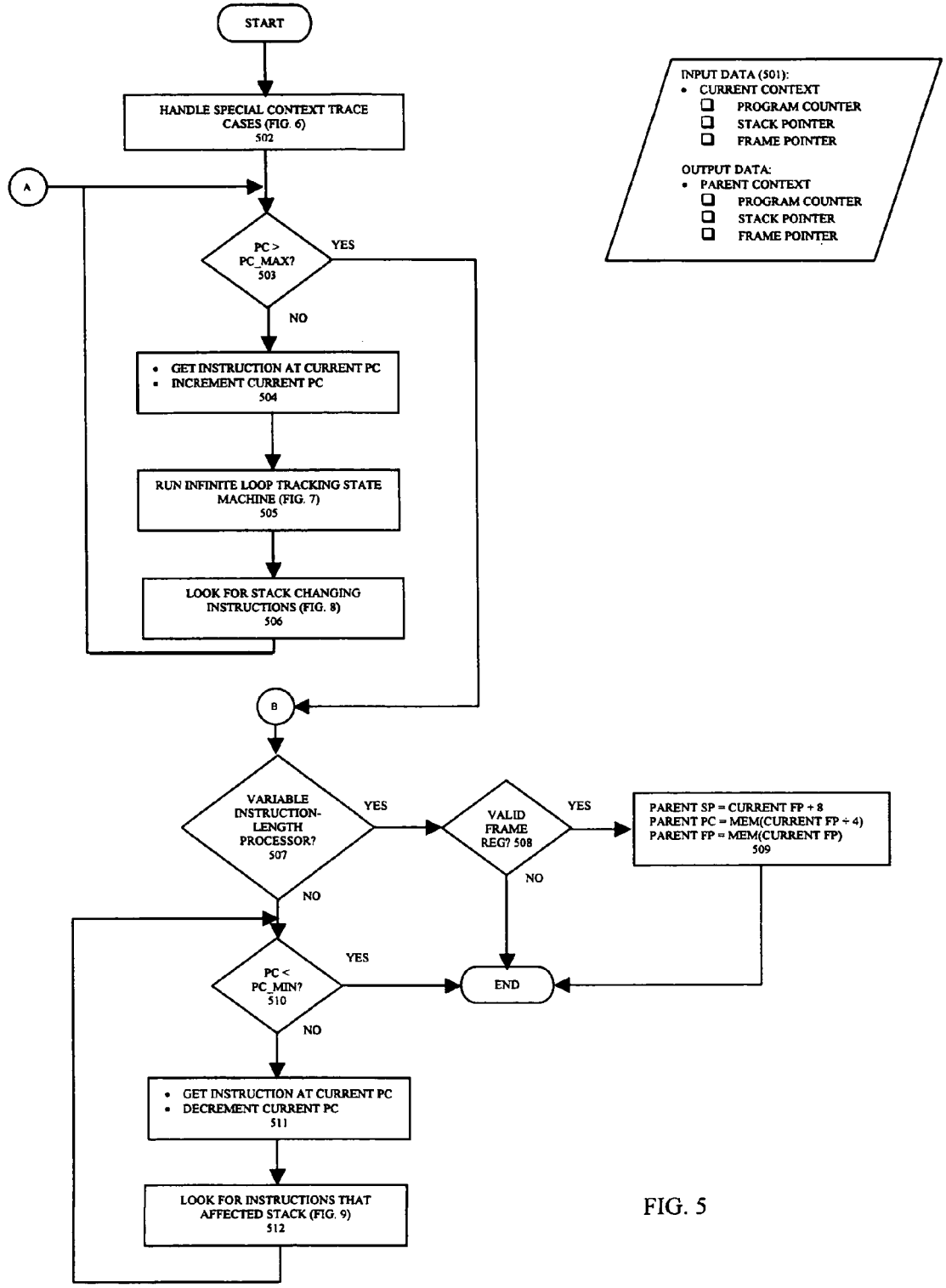
FIG. 5 constitutes a high level flowchart of an embodiment of the invention.

FIG. 5 depicts the inventive technique, which is processor architecture independent, OS-independent, compiler-independent and which doesn't depend on any compiler flags. The inventive technique involves, reading processor instructions from the current program counter to either the end or the beginning of current function. When program counter reaches the end or the beginning of current function, under normal function call cases, the stack pointer should point to the end of current function's parent function. At that point, stack pointer points to return address in parent's function and then the technique is repeated for the parent function.

The algorithm in FIG. 5 specifically looks for instructions, which modify the current stack and current frame pointer (506). While reading instructions from the current program counter until either the end or the beginning of current function, algorithm keeps track of the total change in the stack pointer that needs to be added to the current stack pointer to get the return address in parent function. It is to be noted that the algorithm needs to monitor the change in frame pointer also when reading instructions. This is due to the fact that some object code in an application may be compiled with or without the frame pointer. So, the algorithm may have to read instructions from two different functions (in the same function call history), in which one of the functions is compiled with the frame pointer and the other function is compiled without a frame pointer. If the instructions of a function directly overwrite the current stack pointer value with the frame pointer value when exiting the corresponding function, or if the function doesn't have an epilog (possibly because that function never returns to the parent function), the only option in such case is to use the frame pointer to get to the parent function. A function epilog is a set of one or more instructions, which cause the processor to exit a function and return to parent function of the corresponding function.

While reading each instruction, the proposed technique in FIG. 5 needs to "follow" instruction execution flow. Branches may change this sequential flow of instruction execution (505). Generally, processor architectures support two types of branches: unconditional and conditional branch. These branches may execute a section of machine code repeatedly depending upon the application logic. To avoid repeated execution of the same set of instructions, the technique keeps track of loops and tries, to find an "exit" branch, which takes the current PC out of the loop.

In addition, if the algorithm in FIG. 5 can't figure out the end of the current function (possibly because the function is too large), the algorithm traces backwards from current PC to get to the beginning of current function. It is to be noted that this is only possible on processors with constant instruction length. For variable instruction length processors such as x86 and coldfire, the only option is to look for a valid frame pointer, which points to a valid return address and a valid parent stack pointer (508 and 509). While tracing backwards, the algorithm needs to keep track of only the instructions that affect the stack pointer and frame pointer (512). While tracing backwards, it is also important for the algorithm to recognize the function prolog boundary so that it doesn't step into another function's code and return invalid results. A function prolog is a set of one or more instructions, which mark the beginning of a function. For example, the instruction to change the frame pointer value or the instruction to copy stack pointer value to the frame pointer value, are the examples of instructions, which demarcate the beginning of a function.

The algorithm in FIG. 5 is now explained in more detail. The equations in FIGS. 5, 6, 7, 8, and 9 assume that the processor running the algorithm is a generic 32-bit processor. However, as noted above, the algorithm is equally applicable to any processor of any instruction length. In FIG. 5, input data 501 is the current function's execution context, namely program counter (PC), stack pointer (SP) and frame pointer (FP). Algorithm output is the parent function's PC (or return address), SP and FP. At first, the algorithm handles some special context trace cases (502), in which it is relatively easy to figure out the parent function's context from the current context. More details of this step 502 can be found in FIG. 6. While traversing forward, there could be a maximum number of instructions (PC_MAX) the algorithm may want to analyze before traversing backwards (503). If this maximum number is not exceeded (503), the algorithm reads the instruction at current PC and increments PC by the length of current instruction (504). As explained above, the algorithm keeps track of infinite loops that may lead to repeated execution of the same set instructions. In order to do this, the algorithm defines a state machine to designate the state of algorithm when reading instructions (505). More details of this step 505 can be found in FIG. 7. Also, as explained before, the algorithm checks if the instruction at current PC modifies stack pointer or frame pointer (505). Details of this step can be found in FIG. 8.

If the algorithm in FIG. 5 can't get to the end of current function by traversing forward (in cases such as there is no function epilog at the end of function to recognize function's endpoint or maximum number of instructions read exceeds PC_MAX), it starts tracing backwards (point B in FIG. 5) to get to the beginning of the current function. However, if the current processor has variable length of instructions (507), it is not possible to traverse backwards. In that case, the only option is to check for a valid frame pointer value (508) that possibly points to the parent function's return address. The parent context is calculated with the equations in 509. For a constant-instruction length processor, PC is decremented sequentially until the beginning of the current function (function prolog) is found or the number of instructions read backwards exceeds the maximum number of instructions PC_MIN allowed (510). While traversing backwards, algorithm keeps track of instructions that change current stack pointer and frame pointer in step 512. More details of this step can be found in FIG. 9.

Figure 6:
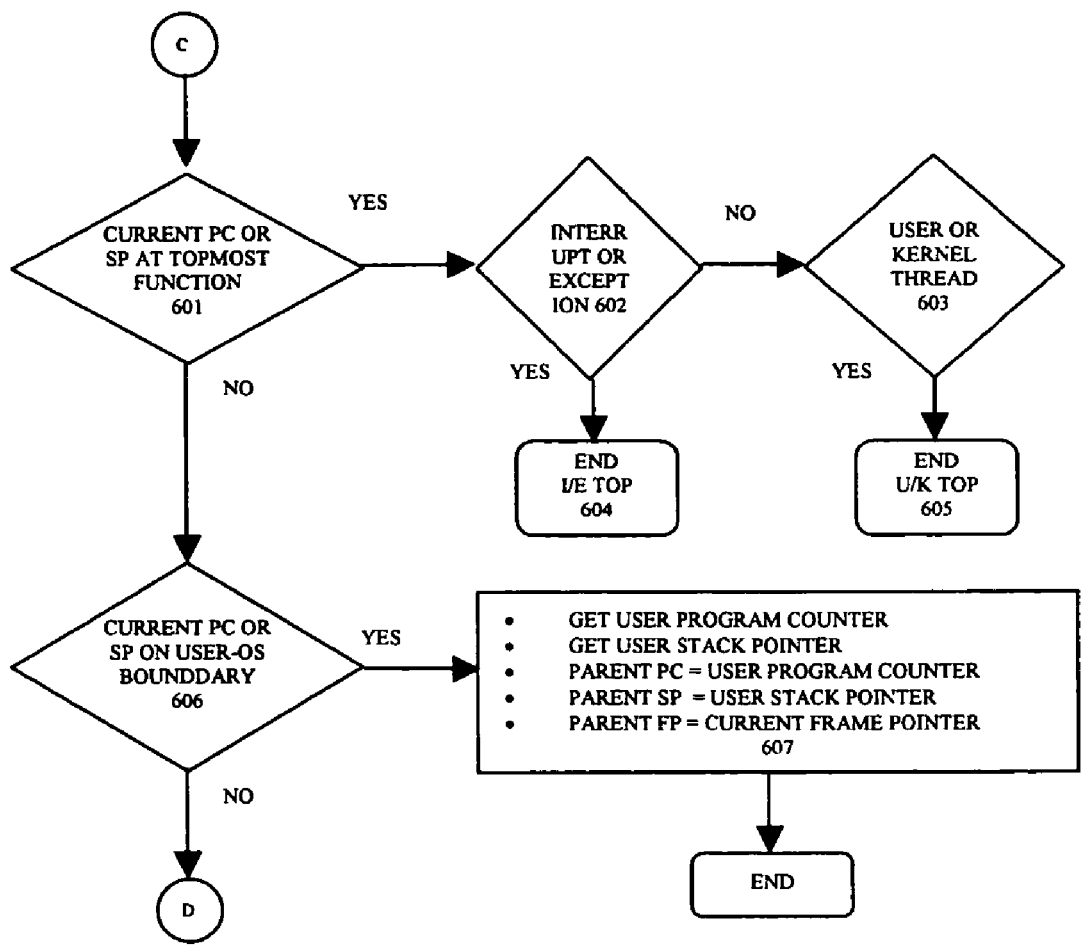
FIG. 6 depicts a flowchart of some special context tracing cases in which it is relatively easy to figure out parent function's context from the current function's context.

FIG. 6 depicts some special cases of context tracing in which it is relatively easy to figure out parent function's context from the current function's context. If the current PC falls in the topmost well-known "entry" function (such as main( ), pthread_start_thread( ) etc) of a thread 603, an interrupt or an exception 602, it is reported as a user or kernel thread "top" 605 or an interrupt or exception "top" 604. This topmost function is OS-dependent, and usually distinct for a user and a kernel thread. Internal OS structures also can also distinguish between different execution paths. If OS has a distinct OS-user boundary, and if current PC is on the OS-user kernel boundary or if stack pointer is at the top of kernel stack (606), parent PC and SP are equal to the user PC and user SP respectively (607). Just before running any OS function, user PC and user SP are usually stored on the kernel stack or in OS data structures of the thread running the OS function. Getting user PC and user SP is therefore OS and processor architecture dependent. Parent function's frame pointer may or may not be saved depending upon whether the corresponding OS function modifies the frame register or not. If the frame pointer is also saved, the new frame pointer is copied from the kernel stack or OS data structure. Otherwise, current function's frame pointer is copied (602) and the algorithm ends.

As explained before, FIG. 7 defines a state machine to designate the state of the algorithm when reading instructions and to avoid repeated execution of the same set of instructions of an infinite loop. The state machine also tries to find an "exit" branch, which takes the algorithm outside any current infinite loop. If the current PC doesn't fall into any infinite loop, NORMAL state is defined. If the algorithm knows that current PC falls into an infinite loop, IN_LOOP state is defined. During this state, algorithm tries to search for the current function's epilog within current infinite loop's boundaries. If the algorithm fails to find current function's epilog in the current infinite loop, state changes to OUT_LOOP. During this state, algorithm tries to find an "exit" branch, which takes the algorithm outside the current loop. If the algorithm fails to find an "exit" branch (in case of functions that never returns), it returns. Usually, all topmost thread functions are non-returning functions.

Figure 7:
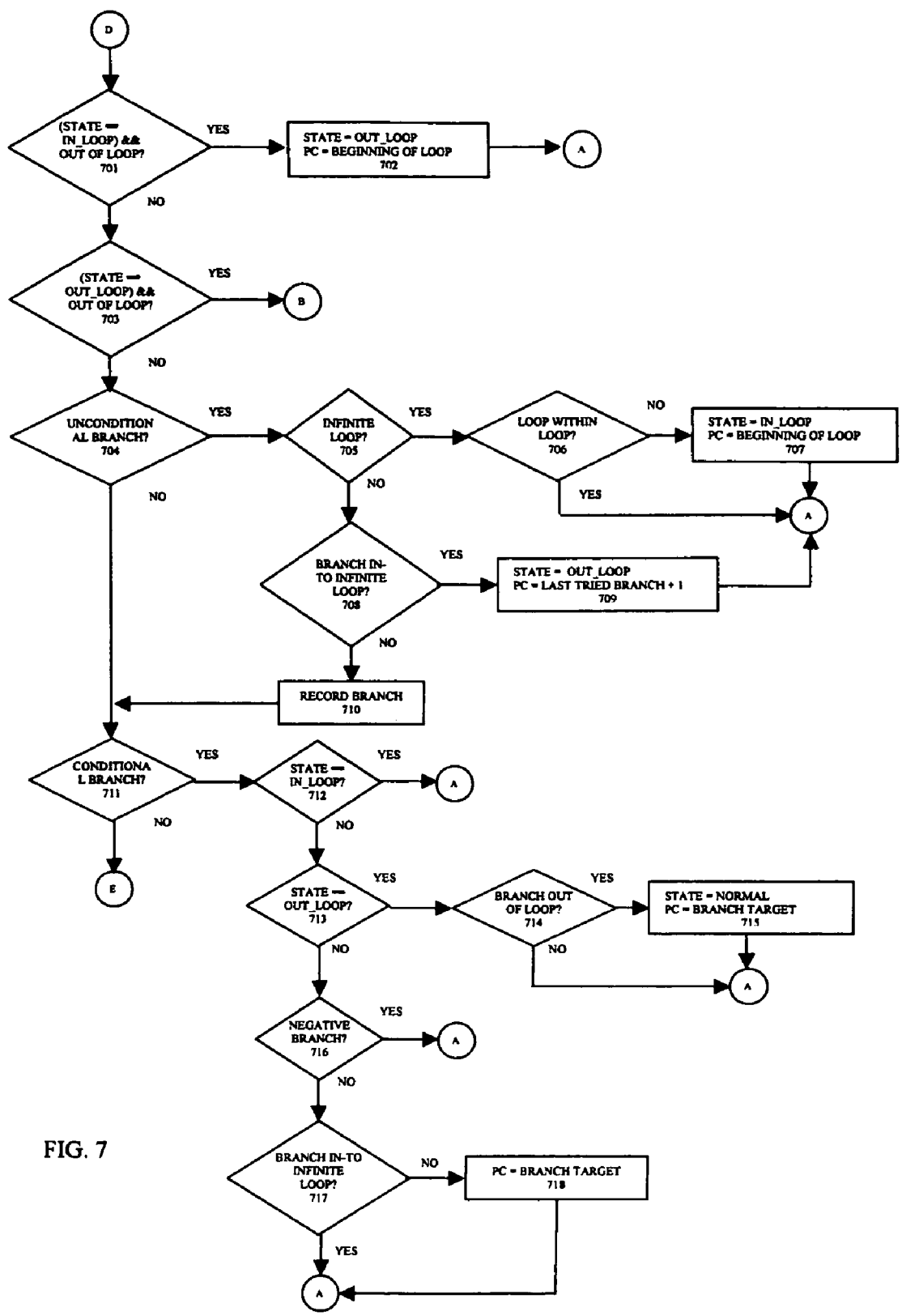
FIG. 7 shows a flowchart of a state machine, which is used to track the state of the algorithm when reading instructions and to avoid repeated execution of the same set of instructions of an infinite loop.

In FIG. 7, the aforementioned state machine is run when each instruction is read. If state is IN_LOOP and current PC is at a loop's boundary (701), state changes to OUT_LOOP and PC points to beginning of current loop (702). Algorithm then returns the control to the point A in FIG. 5. If the state is OUT_LOOP and current PC is at a loop's boundary (703) (i.e. when algorithm can't find an "exit" branch), algorithm starts tracing backwards from the point B in FIG. 5. Unconditional branches cause the application to run infinite loops. If current PC points to an unconditional branch (704), the algorithm checks if the unconditional branch target falls in the code region algorithm has already executed (705). If an infinite loop is detected and the loop is a part of a bigger infinite loop (706) already detected, the loop is ignored and control transfers to point A in FIG. 5. If this is a new infinite loop, the algorithm state changes to IN_LOOP, current PC points to the beginning of loop (707) and control transfers to point A in FIG. 5. If unconditional branch target of the current instruction falls into an already detected infinite loop (708), this means that the "exit" branch which was taken previously to come out of the already detected infinite loop, was inappropriate. Algorithm then falls back to OUT_LOOP state and changes PC to the PC after the "exit" branch instruction that took the algorithm out of the already detected infinite loop (709). Then control transfers to point A in FIG. 5. If the unconditional branch target of the current instruction does not fall within an infinite loop (708), algorithm records current PC where unconditional branch was encountered (710). This record helps in detecting a possible infinite loop later when the algorithm reaches the same unconditional branch instruction again due to the infinite loop in the application logic.

If the algorithm detects a conditional branch (711) at the current PC and state is IN_LOOP (712), the branch is ignored by going to point A in FIG. 5. This is due to the fact that the goal is to traverse each and every instruction in the infinite loop to check if the epilog of current functions lies in the infinite loop. Instead, if the state is OUT_LOOP and the conditional branch takes the control out of the current infinite loop (713), an "exit" branch has been found. Therefore, state changes to NORMAL (715) and PC changes to branch target (715). The current conditional branch is ignored if it does not take the control out of the current infinite loop (714). The algorithm ignores negative branch (716) because it causes the algorithm to possibly reach to the same current PC again thus running into a loop. Therefore, loops are avoided due to the negative branches. Also, if the branch target of current instruction falls into an already detected infinite loop, the branch is ignored and control transfer to point A in FIG. 5.

Otherwise, current PC points the current branch's branch target (718). By performing step 718, an attempt is made to get to the end of current function as quickly as possible. This step is optional and useful for performance reasons.

Figure 8:
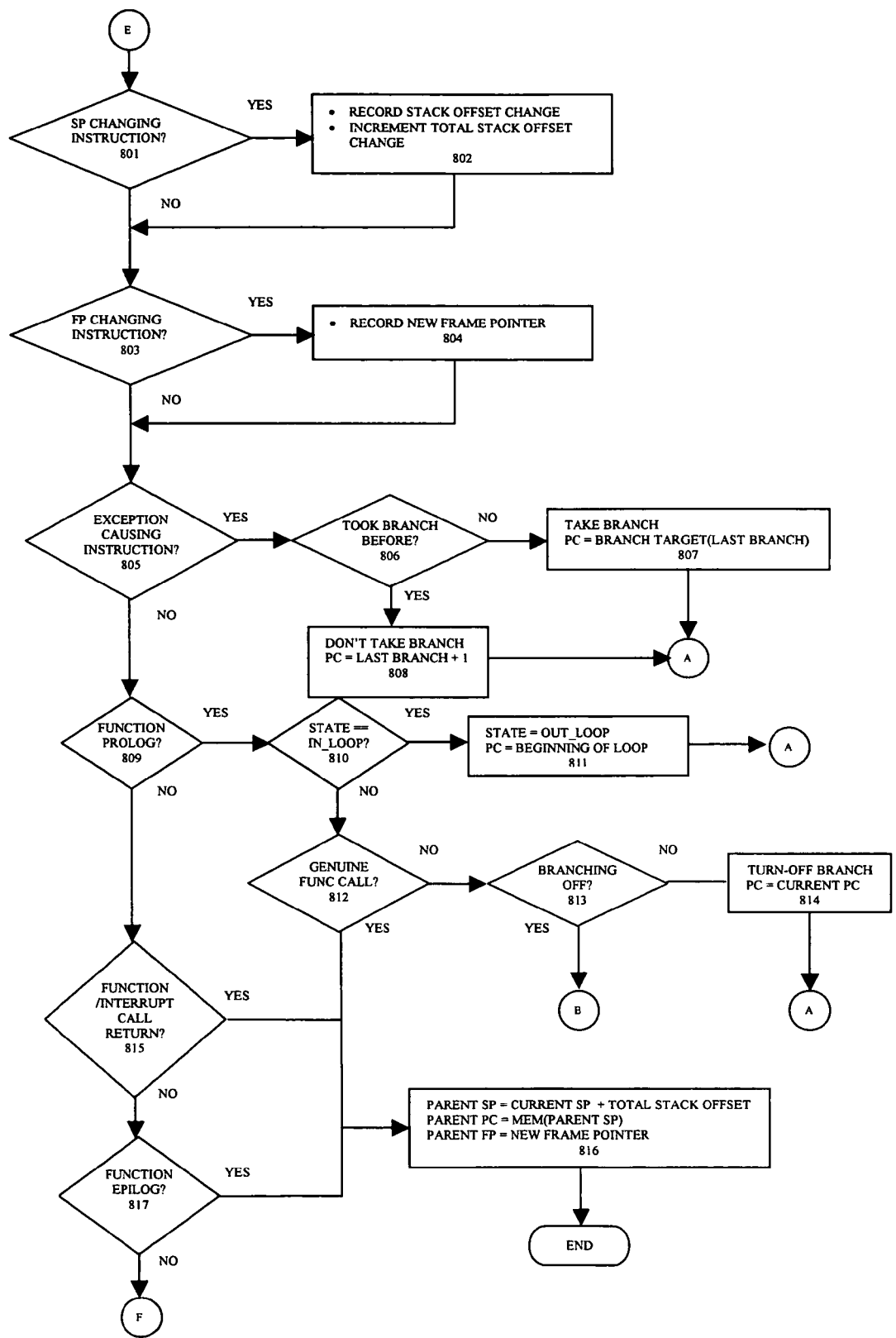
FIG. 8 is a flowchart for keeping track of instructions that change the stack pointer and the frame pointer.

As explained before, the algorithm checks if the instruction at current PC modifies stack pointer or frame pointer by following steps in FIG. 8. Therefore, the algorithm keeps track of instructions, which directly change the current stack pointer (801). This way, when the algorithm reaches the end of current function, it knows the total stack offset, which is the amount the current stack pointer must proceed forward to get to the memory address, where the return address of the parent function is saved. Therefore, the stack offset the current instruction adds to or subtracts from the current SP is recorded and total stack offset change is incremented or decremented (802). Since, the algorithm will potentially be reading instructions from both frame-pointer enabled and frame-pointer less code, the algorithm needs to keep track of instructions that affect frame pointer (803) also. This way, if an instruction loads frame register with the value from stack and uses the value later, the algorithm loads the latest frame pointer. Hence, the algorithm records any update to the current frame pointer (804).

Processors also support some exception causing instructions, which stop the corresponding execution path. Under normal circumstances, this path will not be executed and hence if such exception causing instruction is encountered (805), the current PC has been reached because the last conditional branch (806) either was or was not taken. If the last conditional branch was not taken, that branch is taken by changing current PC to the branch target of last branch (807). If the last conditional branch was taken, the current PC is changed to the PC after the last branch (808).

The algorithm also needs to keep track of the function prolog (809) to determine whether the current function boundary has been exceeded while searching for the current function's epilog. This situation arises when function usually doesn't have an epilog or jumping down the conditional branch targets (718) leads to the code that never returns. If a function prolog is encountered and state is IN_LOOP (810), then the current function's epilog has not been found in the infinite loop. Therefore, state changes to OUT_LOOP (811), and current PC changes to the beginning of loop. Control then transfers to the point A in FIG. 5.

The algorithm may also reach a function prolog, if the compiler does not put any explicit function return instruction and jumps directly to execute the function. So, if this is genuine function call (812), parent context is calculated as per equations in 816. The algorithm may reach block 813, if the current function doesn't return or it in turn calls a function that never returns (e.g. by calling exit( )). This may happen, if some branches have been taken that lead to the current function prolog. So, the algorithm is started again with the branching (718) turned off and PC pointing to current function's PC (814). If the algorithm again reaches the same function prolog after turning off the branching (718), the algorithm starts tracing backwards from the point B in FIG. 5. If the algorithm detects a function epilog (817) or function/interrupt return instruction (815), it means that the algorithm has succeeded in its initial goal of reaching to the current function's end point and therefore, parent context is calculated as per equations in 816.

If algorithm cannot get to the current function's epilog with reading instructions ahead of current PC, it goes backwards from the current PC, until it gets to the beginning of current function. However, if current processor has a variable length of instructions (507), it is not possible to traverse backwards.

Figure 9:
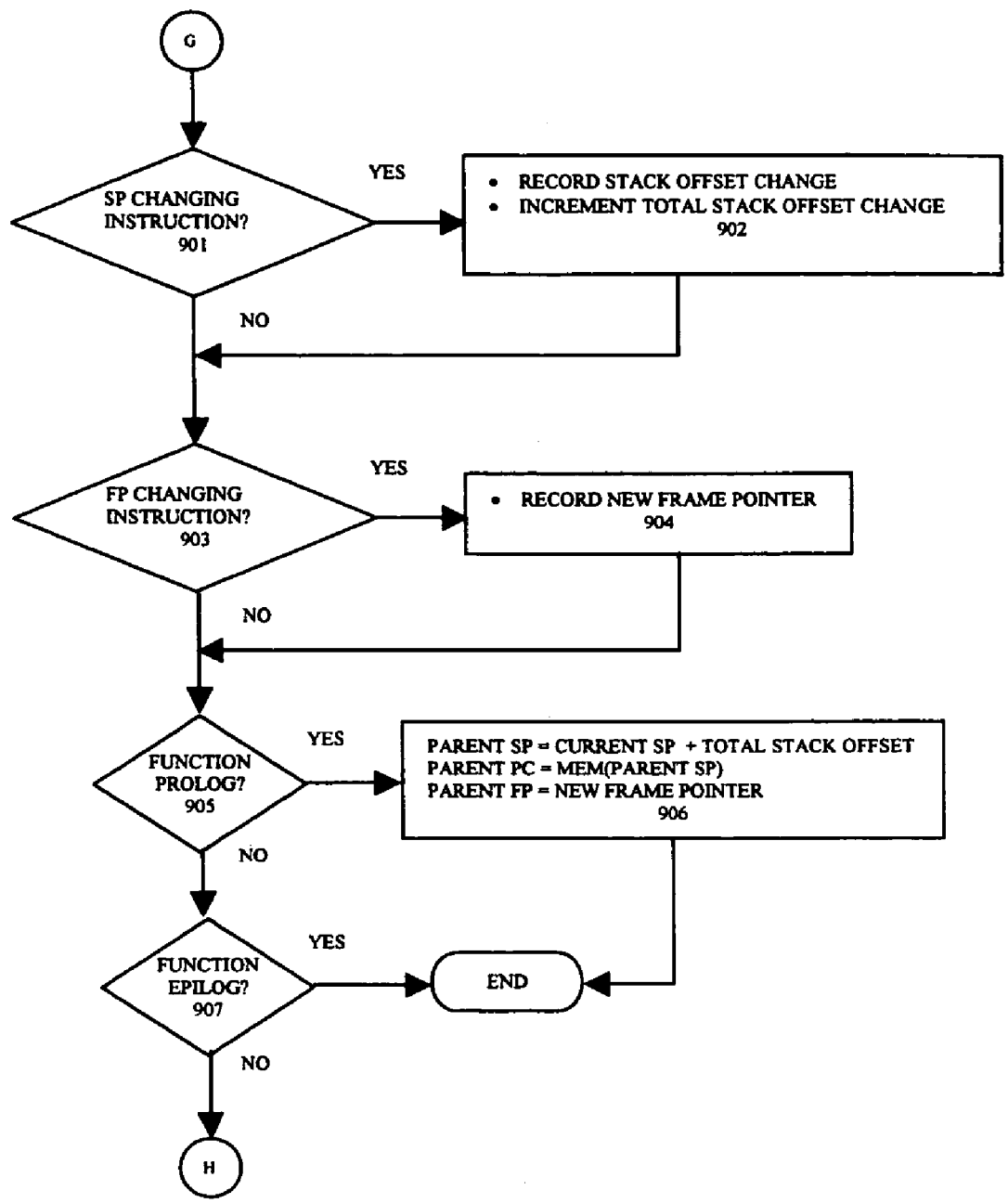
FIG. 9 shows a flowchart, which is used when the current embodiment of invention traces machine instructions backwards from the current program counter value.

In that case, the only option is to check for a valid frame pointer value (508), which possibly points to the parent function's return address (509). For a constant-instruction length processor, PC is decremented sequentially (510). As shown in FIG. 9, algorithm keeps track of instructions, which change the current stack pointer (901 and 902) and current frame pointer (903 and 904) while traversing backwards. If algorithm finds the current function's prolog (905), it calculates parent function's context with the equations in 906.

FIG. 10 depicts one of many possible applications in which the proposed inventive technique could be used. FIG. 10A depicts a generic 4-processor machine that could be setup to interrupt from external clock interrupt (1001). Programmable interrupt controller (PIC) (1002) can be programmed to route clock interrupt to any or all of 4 processors.

There are two ways in which the context of each CPU can be captured:

When any CPU in the system gets an interrupt, it sends an "inter-processor" interrupt to other CPUs essentially forcing other CPUs to record their execution state. This way, it is exactly known what each CPU is doing at each sample interval but this approach considerably increases traffic on system bus and eats up additional CPU cycles.

When a CPU gets an interrupt, it records its own state. The same CPU also sets up the PIC to interrupt the next CPU during next interrupt and it records its state and so on. This approach reduces system bus traffic but doesn't record "exactly" the execution state of each CPU.

From statistical profiling point of view, the profiling statistics of both approaches will be similar if:

1. Sampling rate is higher compared to OS scheduler scheduling rate. Scheduling rate depends on the type of applications running. Since, in statistical profiling, the most interest is in CPU intensive processes, sampling period needs to be smaller than the time slice OS the scheduler gives to a CPU intensive process.

2. The number of CPUs in the system is relatively small. In practice, this number is usually small because fewer CPUs will saturate network bandwidth.

FIGS. 10B and 10C depicts the second approach to statistical profiling. The sample application starts by setting up the clock interrupt to interrupt at the set frequency (1004). In step 1004, the application also sets up the PIC 1002 to interrupt the CPU 0 when the PIC 1002 receives the clock interrupt 1001. The application then waits for the user to stop sampling (1005). When a clock interrupt happens, the interrupt handling CPU samples its own execution state (1007) in either the same clock interrupt service routine (ISR) or a separate task (1003) and gets the corresponding function call history (1008) by the proposed technique. The current CPU also sets up the PIC to interrupt the next CPU at the next interrupt instance (1009). When the sample application is quit, clock interrupt and PIC are reset to their original state (1006).

The present invention is independent of OS and processor architecture. The invention works by "emulating" the instructions starting from the current context that directly affect the corresponding thread stack.

While this invention has been described in terms of several preferred embodiments, there are alterations, permutations, and various substitute equivalents, which fall within the scope of this invention. It should also be noted that there are many alternative ways of implementing the methods and apparatuses of the present invention. It is therefore intended that the following appended claims be interpreted as including all such alterations, permutations, and various substitute equivalents as fall within the true spirit and scope of the present invention.

What is claimed is:

1. A computer implemented method for determining function call history for a system, which runs both code with a frame pointer and a stack pointer and code with a stack pointer and without a frame pointer, comprising:

freezing execution on at least one CPU;

stepping through a function of a plurality of functions that were executing on the at least one CPU, wherein some of the plurality of functions have a frame pointer and a stack pointer and some of the plurality of functions have a stack pointer but do not have a frame pointer, comprising:

keeping track of instructions that change a stack pointer;

keeping track of instructions that change a frame pointer;

determining what instructions change at least one of the stack pointer and the frame pointer to determine an offset to a return address, when the function of the plurality of functions being stepped through has a frame pointer and stack pointer; and determining what instructions change the stack pointer to determine an offset to the return address, while retaining a frame pointer of a previous one of the functions, when the function of the plurality of functions being stepped through has a stack pointer but not a frame pointer;

using the offset to find a parent function that called the function being stepped through; and stepping backwards to find a beginning of the function when instructions for the function are of constant length and the stepping through the function is unable to step forward to an end of the current function.

2. The computer implemented method, as recited in claim 1, further comprising using the keeping track of instructions that change the stack pointer to determine the offset; wherein the using the offset to find the parent function, comprises using the determined offset to determine a return address of the parent function.

3. The computer implemented method, as recited in claim 2, wherein the using the determined offset to determine a return address of a parent function, comprises adding offset to a current stack pointer to find a return address of the parent function.

4. The computer implemented method, as recited in claim 3, further comprising determining infinite loops.

5. The computer implemented method, as recited in claim 4, wherein the determining infinite loops comprises determining unconditional branches.

6. The computer implemented method, as recited in claim 5, using the keeping track of instructions that change a frame pointer to determine a current function's frame pointer.

7. The computer implemented method, as recited in claim 6, further comprising keeping track of instructions that change a program counter.

8. The computer implemented method, as recited in claim 7, further comprising:

checking for a valid frame pointer when an offset is not found within the function; and using the valid frame pointer to find return address in parent function when a valid frame pointer is found.

9. The computer implemented method, as recited in claim 1, wherein an operating system for the CPU is a partitioned memory operating system, and further comprising:

determining whether a memory boundary has been reached; and switching stacks from one memory stack to another memory stack when a memory boundary has been reached.

10. The computer implemented method, as recited in claim 9, further comprising obtaining a program counter for a new segment.

11. The computer implemented method, as recited in claim 1, wherein the plurality of functions comprise variable length instructions.

12. The computer implemented method, as recited in claim 1, wherein the stepping forward through the function steps forward until an epilog is reached and does not step forward in the function past the epilog.

13. The computer implemented method, as recited in claim 1, further comprising determining if a boundary of the function is being passed.

14. The computer implemented method, as recited in claim 1, further comprising keeping track of instructions that stop the execution flow of the current thread.

15. The computer implemented method, as recited in claim 1, wherein the finding the beginning of the function comprises finding the prolog of the function.

16. The computer implemented method, as recited in claim 15, further comprising keeping track of the frame pointer and the stack pointer.

17. The computer implemented method, as recited in claim 1, further comprising determining infinite loops.

18. The computer implemented method, as recited in claim 17, wherein the determining infinite loops comprises determining unconditional branches.

19. The computer implemented method, as recited in claim 1, using the keeping track of instructions that change a frame pointer to determine a current function's frame pointer.

20. The computer implemented method, as recited in claim 1, further comprising keeping track of instructions that change a program counter.

21. The computer implemented method, as recited in claim 1, further comprising:
   checking for a valid frame pointer when an offset is not found within the function; and
   using the valid frame pointer to find return address in a parent function when a valid frame pointer is found.

22. Computer readable storage media for determining function call history for a system, which runs both code with a frame pointer and a stack pointer and code with a stack pointer and without a frame pointer, comprising:
   computer readable code for freezing execution on at least one CPU;
   computer readable code for stepping through a function of a plurality of functions that were executing on the at least one CPU, wherein some of the plurality of functions have a frame pointer and a stack pointer and some of the plurality of functions have a stack pointer but do not have a frame pointer, comprising:
      computer readable code for keeping track of instructions that change a stack pointer;
      computer readable code for keeping track of instructions that change a frame pointer;
      computer readable code for determining what instructions change at least one of the stack pointer and the frame pointer to determine an offset to a return address when the function of the plurality of functions being stepped through has a frame pointer and stack pointer; and
      computer readable code for determining what instructions change the stack pointer to determine an offset to the return address, while retaining a frame pointer of a previous one of the functions when the function of the plurality of functions being stepped through has a stack pointer but not a frame pointer;
   computer readable code for using the offset to make an initial identification of a parent function that called the function being stepped through; and
   computer readable code for stepping backwards to find a beginning of the function when instructions for the function are of constant length and the stepping through the function is unable to step forward to an end of the current function.

* * * * *